July 28, 1970  W. SPRINGER  3,521,980
ROTARY PISTON INTERNAL COMBUSTION ENGINE OF MULTI
DISK CONSTRUCTION
Filed Oct. 31, 1968  2 Sheets-Sheet 1

INVENTOR
WILLI SPRINGER

BY Craig & Antonelli

ATTORNEYS

United States Patent Office 3,521,980
Patented July 28, 1970

3,521,980
ROTARY PISTON INTERNAL COMBUSTION ENGINE OF MULTI DISK CONSTRUCTION
Willi Springer, Faurndau, Kreis Goppingen, Germany, assignor to Daimler-Benz Aktiengesellschaft, Stuttgart-Unterturkheim, Germany
Filed Oct. 31, 1968, Ser. No. 772,207
Claims priority, application Germany, Oct. 31, 1967,
1,576,198
Int. Cl. F02b 53/06
U.S. Cl. 418—60                                   14 Claims

ABSTRACT OF THE DISCLOSURE

A rotary piston internal combustion engine of multi-disk construction, especially of trochoidal type of construction, in which several polygonal pistons are rotatably supported within a housing on respective eccentrics provided on an eccentric shaft; the housing includes lateral parts, at least one intermediate part and at least two housing casings provided with multi-arched internal cam surfaces; apertures are also provided in the internal casing surfaces and/or in the surfaces adjoining the pistons of the intermediate part within the area of the major axis in the relatively cold arc; these apertures are connected with each other by lines, channels or the like which are opened during the operation of the engine during idling speed and smaller partial loads but are closed during higher partial loads and full load; the lines, channels, etc. interconnect with each other at least two of the apertures so that a part of the compressed air or of the compressing fuel-air mixture flows over through these channels, lines or the like from one disk to at least another disk.

---

The present invention relates to a rotary piston internal combusition engine of multi-disk construction, especially of trochoidal type of construction in which, within a housing having lateral parts, at least one intermediate part and at least two housing casings with multi-arched internal casing surfaces containing the control apertures, pistons are supported on the eccentrics of an eccentric shaft.

Rotary piston internal combustion engines with control apertures for the gas exchange arranged in the casing surfaces of the housing casing, exhibit a very poor idling behavior because, as a result of the unavoidable large overlap between the inlet and outlet control aperture during idling speed and small partial loads, a considerable proportion of the exhaust gas is sucked into the suction space until, after the closing of the exhaust control aperture and after the re-expansion of the exhaust gases, a drawing-in of a fresh charge takes place by way of the inlet control aperture. The exhaust gas is disposed in the leading area of the suction space in relation to the direction of rotation of the piston whereas the fresh charge is stored for the most part in the trailing area. This type of charge distribution leads to ignition misfirings and skipping whereby a very uneven and unquiet operation of the internal combustion engine occurs.

For the purpose of eliminating this unsteady operation, it has already been proposed with single-disk internal combustion engines to improve the idling characteristics by an overflow line adapted to be closed and arranged between the compression and trailing suction chamber. However, for multi-disk internal combustion engines, this arrangement of overflow lines adapted to be closed is too complicated and too expensive.

Accordingly, the present invention aims at finding an arrangement for the overflow lines in connection with multi-disk internal combustion engines which can be constructed in a simple manner.

The underlying problems are solved by the present invention in that apertures are provided in the internal casing surfaces or in the surfaces of the intermediate parts adjoining the pistons within the area of the major axis in the cold arc, and in that lines, channels or the like adapted to be closed, which are opened during the operation of the internal combustion engine at idling speed and small partial loads and are closed at higher partial loads and at full load, are provided which connect with each other at least two of these apertures located in different casing surfaces or intermediate parts and through which alternately a part of compressed air or compressed fuel-air mixture flows over from one disk at least into another disk.

The structural peculiarities of multi-disk internal combustion engines are utilized in an advantageous manner by the present invention. The internal casing surface of a disk disposed within the area of the major axis in the cold arc, delimits during rotation of the piston of the one disk sequentially the suction and compression chamber forming above a flank of the piston. It follows therefrom that with multi-disk engines, whose eccentrics are disposed offset on the eccentric shaft and whose pistons are thus also disposed offset or displaced with respect to each other, within a predetermined angular area of the eccentric shaft the mentioned casing zone of the other disk delimits the compression chamber. Within another predetermined area of the angle of roation of the eccentric shaft, the positions of suction and compression chambers are correspondingly interchanged in the disks.

In an advantageous construction of the present invention, only one aperture each may be provided in each internal casing surface within the area of the major axis in the cold arc and these apertures can be all connected with each other by a connecting line adapted to be closed by a closure or valve mechanism.

Advantageously, this connecting line may be constructed as a channel, adapted to be closed by at least one closure mechanism, which extends parallelly to the axis of the eccentric shaft and is arranged in the housing casings of the individual disks.

In order to achieve a good mixture preparation of the exhaust gas-air mixture or of the exhaust gas-fuel-air mixture disposed in the suction chambers by a turbulent overflow of a fresh charge, the apertures provided in the internal casing surface may be in communication with the channel extending in the housing casings by way of bores inclined to the radial direction.

The apertures provided in the internal casing surfaces may thereby be controlled by one valve each adapted to be closed. Accordingly, it is an object of the present invention to provide a rotary piston internal combustion engine of multi-disk construction which avoids by simple means the aforementioned shortcomings and drawbacks encountered in the prior art.

Another object of the present invention resides in a rotary piston internal combustion engine of multi-disk construction in which the idling operation is greatly improved.

A further object of the present invention resides in a rotary piston internal combustion engine of multi-disk construction in which the structural peculiarities of such types of engines are utilized to the fullest extent to improve the mixture preparation and combustion processes, in particular during idling and small partial loads.

These and further objects, features and advantages of the present invention will become more obvious from the following description when taken in connection with the accompanying drawing which shows, for purposes of illustration only, several embodiments in accordance with the present invention, and wherein.

Figure 4:
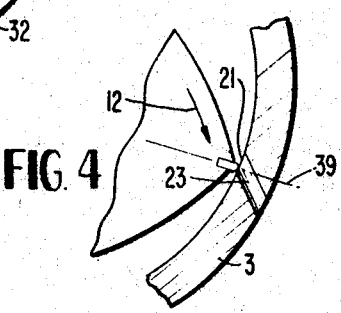
Figure 5:
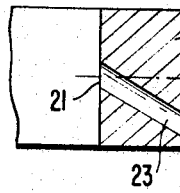
Figure 6:
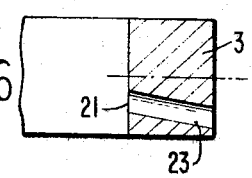
Figure 7:
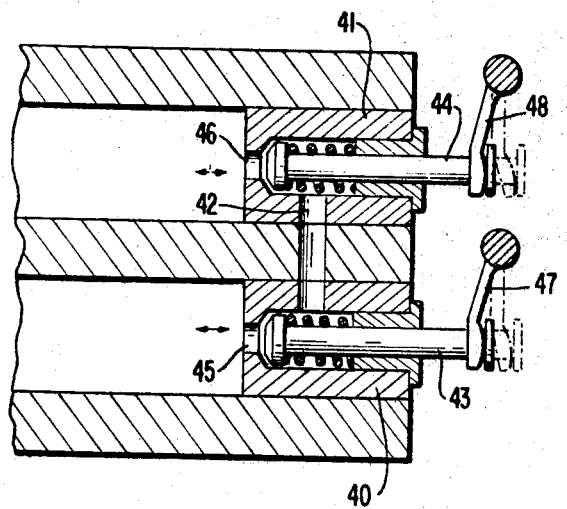

FIGS. 4 to 6 are partial cross-sectional views through different embodiments illustrating different types of constructions of the bores adjoining the apertures provided in the internal casing surfaces; and FIG. 7 is a partial cross-sectional view through a still further modified embodiment in accordance with the present invention which is provided with a connecting channel extending parallel to the axis of the eccentric shaft within the housing casing whose discharges are adapted to be controllably closed by valves.

Figure 1:
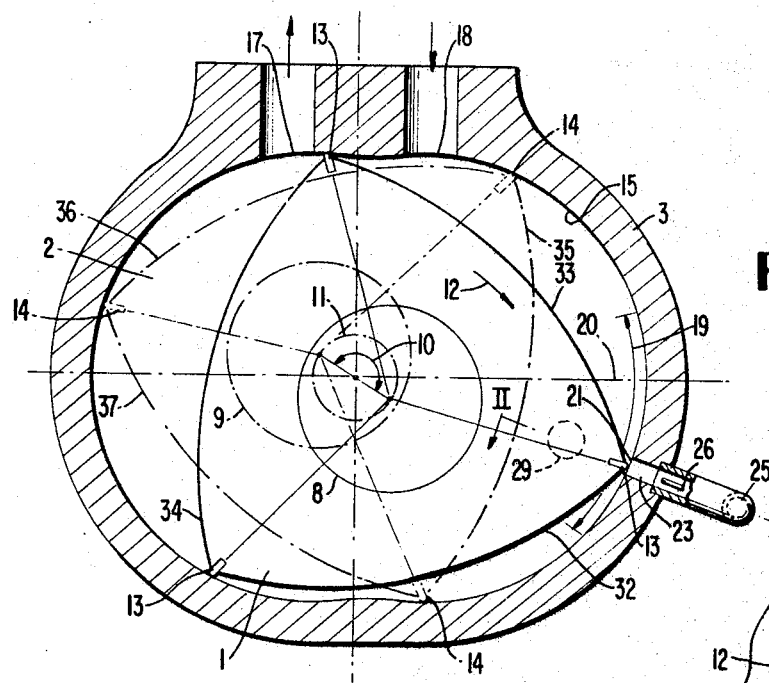
FIG. 1 is a cross-sectional view through the first disk of two-disk rotary piston internal combustion engine in accordance with the present invention.
Figure 2:
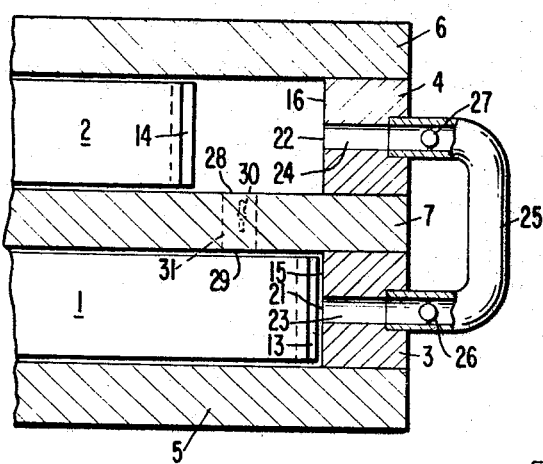
FIG. 2 is a partial cross-sectional view, on an enlarged scale, taken along line II—II of FIG. 1.

Referring now to the drawing wherein line reference numerals are used throughout the various views to designate like parts, and more particularly to FIGS. 1 and 2, the two-disk rotary piston internal combustion engine illustrated in this figure essentially consists of the triangular pistons 1 and 2, of the housing casings 3 and 4, of the lateral parts 5 and 6 connected to the housing casings as well as of an intermediate part 7. The pistons 1 and 2 are supported on the eccentrics 8 and 9 of an eccentric shaft (not shown) whereby the axes of the two eccentrics 8 and 9 displaced by the eccentric angle 10 move along the arc 11 during the rotation of the eccentric shaft. The pistons 1 and 2 slide during the rotation thereof in the direction of arrow 12 with the sealing bars 13 and 14 thereof seated in the corners of the piston along the internal casing surfaces 15 and 16, whereby one outlet control aperture 17 and one inlet control aperture 18 each is controlled or valved.

Apertures 21 and 22 are provided within the area 19 of the major axis 20 in the cold arc which are connected with each other by means of a connecting line 25 and by way of bores 23 and 24. Closure mechanisms 26 and 27 of any conventional construction are so arranged in the connecting line 25 that during the operation of the internal combustion engine at idling speed and small partial loads, the line 25 is opened whereas it is closed during higher partial loads and full loads.

In two-disk engines, as indicated by the dash lines in FIGS. 1 and 2, one aperture 28 and 29 each may be provided in an advantageous manner in the intermediate part 7 adjoining the pistons 1 and 2, which apertures 28 and 29 are connected by a bore 31 disposed in the intermediate part 7 and adapted to be closed by the closure mechanism 30.

During the operation of the internal combustion engine, the triangular piston forms with its flanks 32, 33 and 34 together with the internal casing surface 15, the lateral part 5 and the intermediate part 7, sickle-shaped working chambers; the piston 2 displaced with respect to the piston 1 by the eccentric angle of 180° forms with its flanks 35, 36 and 37 corresponding working chambers.

Figure 3:
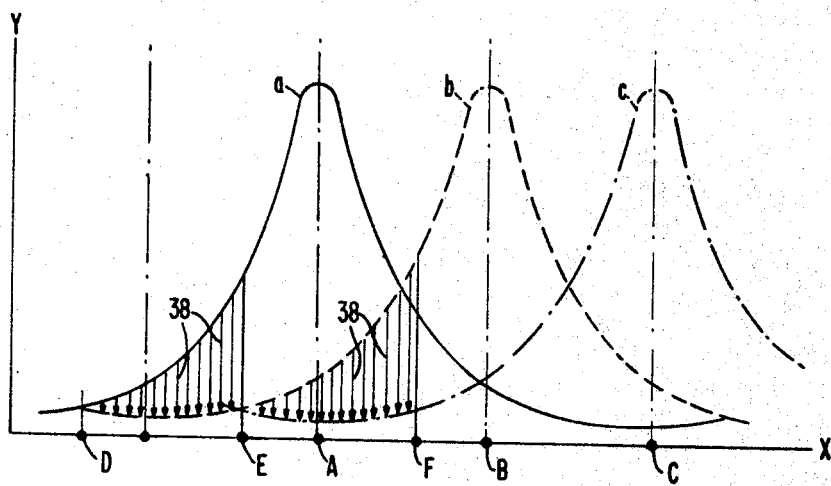
FIG. 3 is a schematic diagram of the pressures forming in the working chambers of the two disks plotted against angle of rotation of the eccentric shaft.

In FIG. 3, the pressure forming over the flanks of the pistons 1 and 2 in the respective working chambers is plotted along the ordinate Y as a function of the angle of rotation of the eccentric shaft, plotted along the abscissa X. The curves a, b and c show the pressure diagram of the working chambers forming above the flanks 32, 35 and 33, respectively, while the eccentric angular positions A, B and C marked along the abscissa and displaced by 180°, indicate the upper dead-center positions during ignition of the chambers disposed above the flanks 32, 35 and 33.

Starting from the eccentric angular position D, the chamber associated with the flank 32 of the piston 1 commences to blow by way of the connecting line 25 fresh air into the chamber associated with the flank 35 of the piston 2 until the angular position E is reached; in this position, the sealing bar 13 according to FIG. 1, valves the aperture 21 and the chamber disposed above the flank 35 of the piston 2 begins to blow into the chamber associated with the flank 33 of the piston 1 until the eccentric angular position F is reached.

The lines 38 of FIG. 3 illustrate the pressure difference between the aforementioned working chambers during the duration of the in-blowing action; the compressing chamber thereby blows over about 180° eccentric angle into the intaking chamber of the adjacent disk.

With a three-disk engine whose apertures provided in the internal casing surface are connected with each other only by one single line, the duration of the blowing-out operation from the compressing chamber into two trailing chambers of the adjacent disks amounts to about 120° of eccentric angle whereas the duration of the inblowing operation into the individual drawing-in chambers amounts to about 240° of eccentric angle. With a four-disk engine, the double arrangement of the two-disk engine is applicable. With the two-disk engine according to FIGS. 1 and 2, there may be provided, in addition to the apertures 21 and 22, one further aperture each within the area 19 of the major axis in the cold arc which are connected with each other by a second line.

FIGS. 4 to 6 illustrate different arrangements of the bores 23 adjoining the aperture 21. According to FIG. 4, the axis of the bore 23 extends in a plane perpendicular to the axis of the eccentric shaft and is disposed inclined to the radial direction 39 so that the overflowing charge flows opposite the direction of rotation 12 of the piston. According to FIG. 5, the axis of the bore 23 extends in a plane parallel to the axis of the eccentric shaft and is inclined to the radial direction 39. According to FIG. 6, the bore 23 is arranged eccentric and inclined.

According to FIG. 7, the connecting line is constructed as channel 42 extending parallel to the axis of the eccentric shaft and arranged in the housing casings 40 and 41, which interconnects with each other the apertures 45 and 46 adapted to be closed by means of valves 43 and 44. The valve cones are spring-loaded by means of springs and may be lifted off by means of the levers 47 and 48 which are controlled in a conventional manner in dependence on the load of the internal combustion engine.

The advantages of the present invention reside in the simple structural arrangement of the overflow lines. The improvement of the idling operation results from the fact that a fresh charge, disposed over the central to trailing part of the flank, is blown-over from the compressing chamber into the adjacent chamber or chambers, and more particularly into the leading zone of the chamber where exhaust gases have been stored. The fresh air blown-in with high velocity effects by means of turbulence a good mixture preparation. Simultaneously as a result of the pumping action, a displacement of the ignitable charge toward the central part of the chamber takes place so that the ignitable charge at the instant of the ignition is disposed in proximity to the spark plug. As a result thereof, ignition skips are prevented and a steady, quiet operation is achieved.

The term "charge" is used in this text and in the appended claims to refer to "combustion air" in injection type engines injecting fuel directly into the combustion spaces or to a "fuel-air mixture" in connection with engines in which the fuel air mixture is drawn-in by the pistons during the suction phase.

While I have shown and described only several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are within the scope of those skilled in the art.

What is claimed:

1. A rotary piston internal combustion engine of multi-disk construction, especially of trochoidal construction in which polygonal pistons are supported on the eccentrics of an eccentric shaft within a housing having lateral parts, at least one intermediate part and at least two housing casings with multi-arched internal casing surfaces containing control apertures, characterized by aperture means provided in the engine within the area of the major axis in the cold arc of said engine, and connecting means operatively connecting with each other at least two of said aperture means to provide alternately an overflow of a part of the charge from one disk to at least another disk including control means for effectively opening said connecting means during idling speed and at smaller partial loads while effectively closing said connecting means during higher partial loads and full load.

2. A rotary piston internal combustion engine according to claim 1, wherein said aperture means are provided in the internal casing surfaces.

3. A rotary piston internal combustion engine according to claim 2, wherein said aperture means are provided in the surfaces adjacent the pistons of a respective intermediate part.

4. A rotary piston internal combustion engine according to claim 1, wherein said aperture means are provided in the surfaces adjacent the pistons of a respective intermediate part.

5. A rotary piston internal combustion engine according to claim 1, wherein said connecting means includes channel means.

6. An internal combustion engine according to claim 1, in which only one aperture means each is provided in each internal casing surface within the area of the major axis in the cold arc, all of said aperture means being connected with each other by only a single connecting line means adapted to be closed by said control means.

7. An internal combustion engine according to claim 6, wherein the connecting means is constructed as channel means extending substantially parallelly to the axis of the eccentric shaft, is arranged in the housing casings of the individual disks and is adapted to be closed by at least one closure means of said control means.

8. An internal combustion engine according to claim 6, wherein the aperture means provided in the internal casing surfaces are in communication with the connecting means by way of bore means disposed at an inclination to the radial direction.

9. A rotary piston internal combustion engine according to claim 6, wherein the aperture means provided in the internal casing surfaces are each adapted to be controllably closed by a respective valve means.

10. A rotary piston internal combustion engine according to claim 9, wherein said valve means are automatically controlled in dependence on the load and rotational speed of the engine.

11. An internal combustion engine according to claim 1, wherein the connecting means is constructed as channel means extending substantially parallelly to the axis of the eccentric shaft, is arranged in the housing casings of the individual disks and is adapted to be closed by at least one closure means of said control means.

12. An internal combustion engine according to claim 1, wherein the aperture means provided in the internal casing surfaces are in communication with the connecting means by way of bore means disposed at an inclination to the radial direction.

13. A rotary piston internal combustion engine according to claim 1, wherein the aperture means provided in the internal casing surfaces are each adapted to be controllably closed by a respective valve means.

14. A rotary piston internal combustion engine according to claim 13, wherein said valve means are automatically controlled in dependence on the load and rotational speed of the engine.

References Cited

UNITED STATES PATENTS

| 3,077,867 | 2/1963 | Froede | 123—8 |
| 3,412,716 | 11/1968 | Tausch et al. | 123—8 |

MARK M. NEWMAN, Primary Examiner

A. D. HERRMANN, Assistant Examiner